United States Patent [19]

Veenvliet et al.

[11] Patent Number: 4,888,201
[45] Date of Patent: Dec. 19, 1989

[54] METHOD OF MANUFACTURING A DIFFUSE REFLECTOR

[75] Inventors: Hendrik Veenvliet; Antonius H. M. Raaymakers; Maarten J. Verkerk; Arnold H. Witjes, all of Eindhoven, Netherlands

[73] Assignee: U.S. Philips Corporation, New York, N.Y.

[21] Appl. No.: 108,403

[22] Filed: Oct. 13, 1987

[30] Foreign Application Priority Data

Oct. 13, 1986 [NL] Netherlands .................. 8602567

[51] Int. Cl.⁴ .................. B29C 59/00; B29D 11/00
[52] U.S. Cl. .................. 427/38; 156/643; 264/1.3; 264/1.4; 264/1.9; 264/2.6; 427/54.1; 427/163; 427/307
[58] Field of Search .......... 264/1.4, 1.9, 1.3, 2.6; 427/40, 163, 307, 38, 54.1; 156/643, 645

[56] References Cited

U.S. PATENT DOCUMENTS

| 1,578,982 | 3/1926 | Gloster | 264/1.9 |
| 2,444,532 | 7/1948 | Richardson | 264/1.9 |
| 2,444,533 | 7/1948 | Richardson | 264/1.9 |
| 2,464,738 | 3/1949 | White et al. | 264/2.6 |
| 3,346,674 | 10/1967 | Kidder et al. | 264/1.9 |
| 3,810,804 | 5/1974 | Rowland | 264/1.9 |
| 3,811,999 | 5/1974 | Fleischer et al. | 156/643 |
| 4,379,180 | 4/1983 | Baglin et al. | 156/643 |
| 4,395,434 | 7/1983 | Imada et al. | 427/40 |
| 4,521,442 | 6/1985 | Guarnieri | 156/643 |
| 4,567,123 | 1/1986 | Ohtaba et al. | 264/1.4 |
| 4,747,981 | 5/1988 | Robinson | 264/1.9 |
| 4,770,824 | 9/1988 | Blom | 264/1.9 |

FOREIGN PATENT DOCUMENTS

| 8300422 | 9/1984 | Netherlands | 264/1.9 |
| 1009569 | 5/1964 | United Kingdom | 264/1.9 |

Primary Examiner—James Lowe
Attorney, Agent, or Firm—John C. Fox

[57] ABSTRACT

Diffuse reflectors are manufactured by depositing a reflecting material (5) on a roughened surface of a synthetic resin layer (1), roughened by treatment in a polyhalogenated hydrocarbon plasma containing fluorine and carbon, such as FREON, containing plasma or by means of UV radiation. The layer (5) of reflecting material may also be deposited on the resin layer (11) at an elevated temperature.

20 Claims, 1 Drawing Sheet

METHOD OF MANUFACTURING A DIFFUSE REFLECTOR

BACKGROUND OF THE INVENTION

The invention relates to a method of manufacturing a diffuse reflector in which a surface pattern is provided in a synthetic resin layer.

The invention also relates to a diffuse reflector obtained by such a method.

Diffuse reflectors are notably used in flat display devices such as liquid crystal display devices (LCDs) and electroscopic display devices, but other uses are also known.

A method of the type described in the opening paragraph is described in European Application No. 0,084,930, laid open to public inspection, in which a diffusely reflecting metal surface is provided in a liquid crystal display device by providing a thin layer of reflecting material on a resin layer having projections and recesses. The projections and recesses are provided in advance in the resin layer by means of photolithographic techniques using a photomask, with a second resin layer functioning as a photoresist. Such a method requires inter alia the desired masking step and an etching step in order to realize a surface structure, after which the second layer is removed.

British Patent Specification GB 2,066,545A describes another method of manufacturing diffuse reflectors. In this method a metal film is reactively deposited by means of vapour-deposition techniques or sputtering while adding a small quantity of water. A drawback of this reactive deposition with water (or oxygen) is, however, that the composition of the mixture to be used is very critical during the reaction. Upon deposition, hydroxides or oxides may also be formed, which may considerably reduce the light dispersion.

SUMMARY OF THE INVENTION

It is an object of the invention to provide a method of manufacturing a diffuse reflector in which no previous photolithographic step is required while in addition the drawbacks of reactive deposition do not occur.

To this end a method according to the invention is characterized in that the surface pattern is obtained by means of roughening the top layer of the synthetic resin layer.

The invention is based on the recognition that notably for photosensitive resin layers various roughening methods can be used by means of which a suitable surface pattern is obtained for a diffuse reflector thus obviating the need for determining the reflection defining structure in advance.

A first roughening method comprises treatment a top layer of a synthetic resin as a result of which the in a polyhalogenated hydrocarbon plasma containing fluorine and carbon, such as FREON, or via UV radiation, top layer is under a certain stress.

In a subsequent heating step (180° C.-250° C.), relaxation occurs in this top layer so that roughening of the surface layer occurs. By suitable choice of material, layer thickness and process parameters such as etching time, heating time, plasma content of a polyhalogenated hydrocarbon plasma containing fluorine and carbon, such as FREON, etc. structures are formed such that after coating with a reflecting material, satisfactory diffuse reflectors are obtained.

In a second method roughening is realized by vapour-depositing a layer of a reflecting material to a thickness of at least 0.4 micrometer at an elevated temperature at which the resin layer starts to flow to some extent. A suitable choice of process parameters results in a satisfactory diffuse reflector being obtained in this way.

The profile of the roughened layer provided in a synthetic resin layer may also be transferred into a subjacent substrate by means of etching (for example, reactive ion etching or plasma etching). This substrate may consist of, for example, a polymer or other synthetic material which of itself is not sensitive to the abovementioned roughening treatment. After the surface profile is transferred by means of etching into the substrate, the substrate is coated with a reflecting layer to obtain a diffuse reflector. On the other hand, this substrate itself may already consist of a reflecting material, in which, case transfer of the profile obtained by roughening leads directly to a diffuse reflector.

BRIEF DESCRIPTION OF THE DRAWING

The invention will now be described in greater detail with reference to some specific embodiments in conjunction with the accompanying drawing, in which FIGS. 1 to 3 diagrammatically show the manufacture of a diffuse reflector by one embodiment of the method according to the invention.

DESCRIPTION OF THE PREFERRED EMBODIMENT

Figure 1:
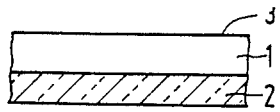
Figure 1:
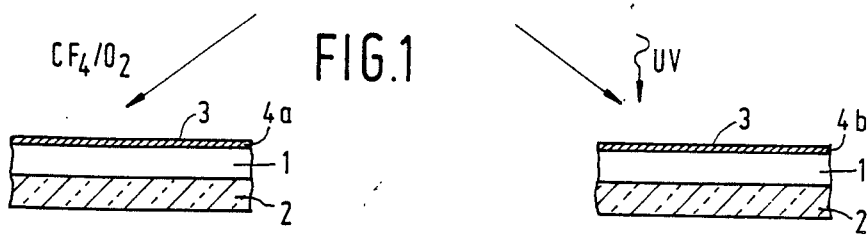

Referring now to FIG. 1, synthetic resin layer, 1 may be a photoresist of the type Waycoat HPR (Hunt Positive Projection Resist) 204, having a thickness of approximately 1.2 μm. The layer 1 is baked at a temperature of approximately 90° and may be exposed, if necessary, and may be subjected to a second baking step of approximately 30 minutes at approximately 120° C. Photoresist layer 1 is provided on a supporting plate 2 of, for example, glass. In a liquid crystal device this glass plate may constitute one of the two glass plates which together enclose the liquid crystal material.

Figure 2A:
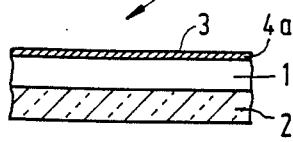

In a first embodiment of the method according to the invention the photoresist layer 1 is treated for some minutes in a polyhalogenated and hydrocarbon etchant containing fluorine and carbon, such as FREON, to which several percent of oxygen has been added. Due to physical-chemical modification a top layer 4a is created on the surface 3, which layer had a close structure with a strong cross-linking, possibly because teflon-like reaction products are formed (FIG. 2a).

A close structure on the surface 3 may also be obtained by irradiation of the layer 1 with UV light (dose approximately 10 J/cm$^2$) whose wavelength is, for example, in the range of 200-320 nm. In this case so-called cross-linking occurs so that a top layer 4b is formed with a strong cross-linking (FIG. 2b).

Figure 2B:
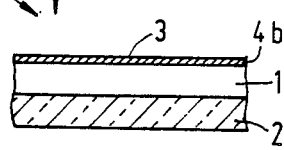

Both the layer 4a (FIG. 2a) and the layer 4b in FIG. 2b are under comparatively high chemical stresses. When the assembly is heated for approximately ½ hour to approximately 200° C. the layers 4a and 4b relax because the subjacent photoresist layer 1 which is not attacked by the etching treatment or UV radiation starts to flow to some extent. As a result the surface 3 is rippled so that the surface is deformed in such a manner that after vapour deposition of a reflecting material, for example, a 0.3 μm thick layer 5 of silver or aluminium, a satisfactory diffuse reflector is obtained.

Figure 4:
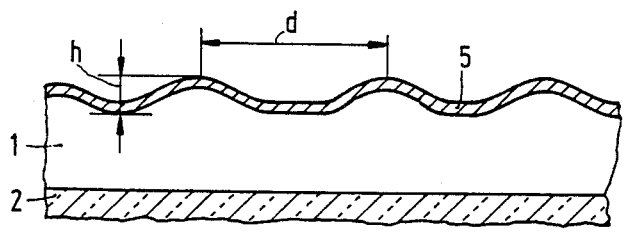
FIG. 4 shows a detail of FIG. 3, whilst

Depending on the process parameters used reflectors can be obtained in which the average height variation h (FIG. 4) is 10-1000 nanometers and the average mutual distance d between 2 projections is 1-10 μm. Notably at h≧60 nm and d≧3.5 μm, a substantially complete (approximately 99%) diffuse reflection occurs.

Figure 3:
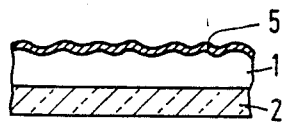

A structure similar to that of FIG. 3 may also be obtained by heating a photoresist layer 1 to approximately 175° C., and by vapour depositing at this temperature a layer of reflecting metal (silver or aluminium) having a thickness of 0.4 μm or more on the photoresist layer. Under the influence of the interaction of the photoresist and the metal, during which possibly released heat and/or mechanical stress plays a role, a kind of roughening of the metal surface occurs.

The reflecting structure thus obtained may be divided into a plurality of reflectors (sub-structures) by patterning the metal by means of a photo-lithographic process, and by etching off the portions of the photoresist layer exposed thereby using the remaining metal as a mask.

Figure 5:
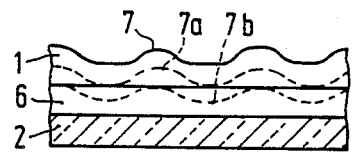
FIGS. 5 and 6 diagrammatically show another embodiment of the method according to the invention.

In FIG. 5 a substrate 6 is present between the supporting plate 2 and the photoresist layer 1, which substrate consists of a material to which the roughening treatment as described hereinbefore is not applicable, for example, a cross-linked polymer such as KAPTON. With one of the methods described above, the surface of the layer 1 has acquired a profile 7. The device of FIG. 5 can now be subjected to such an etching treatment (reactive ion etching or plasma etching) whereby the profile 7 is partly (profile 7a) or entirely (profile 7b) transferred into the substrate 6. Depending on the materials used for the photoresist layer 1 and the substrate 6, this etching treatment may take place under the same conditions (etchant, temperature, etc.) or alternately under different conditions. Due to small differences in etching rates the ultimate structure may slightly deviate from that obtained by the roughening treatment.

Figure 6:
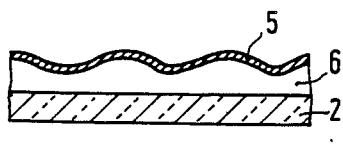

After the etching treatment is finished the surface of the exposed substrate 6 with profile 7 is provided with a layer 5 of a reflecting material, (FIG. 6), whereby a diffuse reflector is obtained.

Figure 7:
FIG. 7 shows a modification in which the subadjacent substrate is reflective.

The substrate 6 may alternatively consist of a layer 11 of a reflecting material (FIG. 7), in which case the reflector is immediately finished when the profile 7 is transferred into the layer 11 by means of etching.

The invention is of course not limited to the embodiments shown, but other embodiments within the scope of the invention are possible and will be apparent to those skilled in the art.

The invention can also be used with other synthetic resins which can be roughened by the methods described or can be provided in another way with a thin top layer of plastic material causing roughening upon relaxation.

Depending on the use of the reflector and consequently on the choice of d and h, it is possible to vary the process parameters such as etching times, temperatures, etc. and also the etchants, etc.

What is claimed is:

1. A method of manufacturing a diffuse reflector having a surface pattern comprising the steps of
   (a) providing a layer of synthetic resin on a substrate layer,
   (b) forming a profile on a top surface layer of said synthetic resin by the steps of irradiating said top surface layer with UV radiation, and subsequently heating to a temperature of between 180° C. and 250° C., and
   (c) etching said profile at least partly into said substrate layer.

2. A method of manufacturing according to claim 1, wherein after said step (c), a further step of providing the etched surface with a layer of reflecting material is carried out.

3. A method of manufacturing according to claim 2, wherein said reflecting material is silver or aluminum.

4. A method of manufacturing according to claim 1, wherein said substrate layer consists of a reflecting material, and wherein said step (c) is carried out until said profile is completely etched into said substrate layer.

5. A method of manufacturing according to claim 4, wherein said reflecting material is silver or aluminum.

6. A method of manufacturing according to claim 1, wherein said step (a) is carried out by depositing said substrate layer and said layer of synthetic resin on a supporting plate.

7. A method of manufacturing a diffuse reflector having a surface pattern comprising the steps of
   (a) providing a layer of synthetic resin on a substrate layer,
   (b) forming a profile on a top surface layer of said synthetic resin by the steps of treating said top surface layer to a plasma of polyhalogenated hydrocarbons containing fluorine and carbon, and then heating to a temperature of between 180° C. and 250° C., and
   (c) etching said profile at least partly into said substrate layer.

8. A method of manufacturing according to claim 7, wherein after said step (c), a further step of providing the etched surface with a layer of reflecting material is carried out.

9. A method of manufacturing according to claim 8, wherein said reflecting material is silver or aluminum.

10. A method of manufacturing according to claim 7, wherein said substrate layer consists of a reflecting material, and wherein said step (c) is carried out until said profile is completely etched into said substrate layer.

11. A method of manufacturing according to claim 10, wherein said reflecting material is silver or aluminum.

12. A method of manufacturing according to claim 7, wherein said step (a) is carried out be depositing said substrate layer and said layer of synthetic resin on a supporting plate.

13. A method of manufacturing a diffuse reflector having a surface pattern comprising the steps of:
   (a) providing a layer of a synthetic resin,
   (b) forming a surface pattern in a top surface layer of said synthetic resin by treating said top layer to a plasma of polyhalogenated hydrocarbons containing fluorine and carbon, and then heating to a temperature of between 180° C. and 250° C., and
   (c) coating the patterned top layer with a layer of reflecting material.

14. A method of manufacturing according to claim 13, wherein step (c) of coating is carried out by depositing a metal to a thickness of at least 0.4 micrometers at an elevated temperature.

15. A method of manufacturing according to claim 14, wherein said metal layer is one of silver or aluminum.

16. A method of manufacturing according to claim 13, wherein step (a) is carried out by depositing said layer of synthetic resin on a supporting plate.

17. A method of manufacturing a diffuse reflector having a surface pattern comprising the steps of:
 (a) providing a layer of a synthetic resin,
 (b) forming a surface pattern in a top surface layer of said synthetic resin by irradiating said top layer with UV radiation, and subsequently heating to a temperature of between 180° C. and 250° C., and,
 (c) coating the patterned top layer with a layer of reflecting material.

18. A method of manufacturing according to claim 17, wherein step (c) of coating is carried out by depositing a metal layer to a thickness of at least 0.4 micrometers at an elevated temperature.

19. A method of manufacturing according to claim 18, wherein said metal layer is one of silver or aluminum.

20. A method of manufacturing according to claim 17, wherein step (a) is carried out by depositing said layer of synthetic resin on a supporting plate.

* * * * *